United States Patent
Leu et al.

(10) Patent No.: US 7,336,423 B2
(45) Date of Patent: Feb. 26, 2008

(54) HYBRID LENS

(75) Inventors: Charles Leu, Fullerton, CA (US);
Tai-Cherng Yu, Fullerton, CA (US);
Ga-Lane Chen, Fullerton, CA (US)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 188 days.

(21) Appl. No.: 11/070,507

(22) Filed: Mar. 2, 2005

(65) Prior Publication Data
US 2005/0231812 A1 Oct. 20, 2005

(30) Foreign Application Priority Data
Apr. 16, 2004 (TW) .............................. 93110630 A

(51) Int. Cl.
G02B 3/00 (2006.01)
G02B 3/02 (2006.01)
G02C 7/02 (2006.01)
(52) U.S. Cl. .................. 359/642; 351/166; 359/708
(58) Field of Classification Search .............. 359/642, 359/708; 351/166
See application file for complete search history.

(56) References Cited
U.S. PATENT DOCUMENTS 3,953,652 A * 4/1976 Addiss et al. ............... 428/412
4,237,183 A 12/1980 Fujiwara et al.
5,054,902 A * 10/1991 King ........................... 351/44
6,084,724 A * 7/2000 Wiegand et al. ............ 359/796
6,551,530 B2 4/2003 Koizumi et al.
7,025,458 B2 * 4/2006 Vu .............................. 351/177

OTHER PUBLICATIONS

Feng Chen, "PVT State Diagram For Plastics Injection Molding and its Application", Light Industry Machinery, vol. 4, 2000, pp. 5-10, 1005-2895(2000)04-0005-05, Published by China Academic Journal Electronic Publishing House, 2000.
Ying-Chuan Wang, "The Current State And Development Of Vacuum Coating Technology", Modern Instuments, vol. 6, 2000, pp. 1-4, Published by Chiina Academic Journal Electronic Publishing House, 2000.

* cited by examiner

*Primary Examiner*—Scott J. Sugarman
(74) *Attorney, Agent, or Firm*—Morris Manning Martin LLP; Tim Tingkang Xia, Esq.

(57) ABSTRACT

A hybrid lens (10) includes a plastic lens (12) and a glass coating film (14). The plastic lens is manufactured by injection molding. The glass coating film is formed on an outer surface of the plastic lens and encloses the outer surface of the plastic lens. The coating film comprises a single layer of glass material or a plurality of layers of glass material. The glass coating film is deposited on the outer surface of the plastic lens by vacuum deposition. The hybrid lens reduces chromatic aberration and provides improved image quality for an imaging system. A method for making the hybrid lens is also provided.

13 Claims, 1 Drawing Sheet

HYBRID LENS

BACKGROUND OF THE INVENTION

1. Field of the Invention

The present invention relates to hybrid lenses and particularly to a hybrid lens for an imaging system.

2. Prior Art

With the ongoing development of microcircuitry and multimedia technology, digital cameras are now in widespread use. High-end portable electronic devices such as mobile phones and PDAs (Personal Digital Assistants) are being developed to be increasingly multi-functional. Many of these portable electronic devices are now equipped with a digital camera. Optical lenses are a key element of digital cameras, particularly in miniaturized digital cameras where high image quality is desired.

Conventionally, lenses in digital cameras are made of glass or plastic. Plastic lenses have the advantage of lower cost over glass lenses. However, plastic lenses are generally formed by molding, and tend to have problems such as deformation and low optical precision. In particular, deformation limits the ability of a plastic lens to correct chromatic aberration, and reduces the image quality of the digital camera. In summary, single lenses made of either glass or plastic cannot meet the dual demands for low cost and high image quality of digital cameras.

Recently, so-called hybrid lenses have been developed in an effort to overcome the above problems. Conventionally, an aspherical composite layer is formed on a single lens of optical glass serving as a substrate. Hybrid lenses are commercially practical as a means for forming an aspherical lens at relatively low cost. A hybrid lens is generally produced by transferring an aspherical composite layer made of an ultraviolet-curing resin onto the surface of a single lens made of optical glass.

FIG. 2 shows a conventional means and method for forming a hybrid lens. In the method, a predetermined amount of ultraviolet-curing resin 22 is poured on a mirror-finished transfer face 21 of a die 30, in order to form an aspherical composite layer. A glass convex lens 23 is placed in the die 30, and fixed to the ultraviolet-curing resin 22 by using a support frame 24. The ultraviolet-curing resin 22 thereby covers the entire transfer face 21. Then ultraviolet (UV) rays are applied from the side of the glass convex lens 23 for a predetermined time. The ultraviolet rays propagate through the glass convex lens 23 and cure the ultraviolet-curing resin 22. Thus an aspherical composite layer is formed on the glass convex lens 23, thereby providing the hybrid lens.

The above-described method allows a hybrid lens to be produced at a relatively low cost, because the die 30 has excellent workability and durability. However, depending on the type of the optical glass used, the glass convex lens 23 may not readily allow the ultraviolet rays to pass therethrough. In some cases, an excessively long time is needed to cure the ultraviolet resin 22, and productivity is thereby reduced. For this reason, only certain types of optical glass are suitable for commercial manufacturing.

In addition, the applied ultraviolet rays tend to be focused by the glass convex lens 23. In particular, the applied ultraviolet rays concentrate toward a center of the bottom surface of the glass convex lens 23, as shown in FIG. 2. This non-uniform distribution of ultraviolet rays results in the ultraviolet-curing resin 22 being cured non-uniformly, making it difficult to produce a precise hybrid lens.

Furthermore, because the ultraviolet-curing resin 22 is formed on an outer surface of the glass convex lens 23, the ultraviolet-curing resin 22 of the hybrid lens is subject to deformation. Moreover, the curing process is suitable only for the ultraviolet-curing resin 22, and other kinds of plastic material cannot be used.

Therefore, a new hybrid lens and a method for making the hybrid lens are desired in order to overcome the above-described problems.

SUMMARY OF THE INVENTION

It is therefore an object of the present invention is to provide a low cost hybrid lens with reduced chromatic aberration.

To achieve the above object, a hybrid lens includes a plastic lens and a glass coating film. The coating film is formed on an outer surface of the plastic lens. The coating film comprises a single layer of glass material or a plurality of layers of glass material. Preferably, the coating film encloses the plastic lens.

It is of advantage that the plastic lens is surrounded by the glass coating film, whereby deformation of the hybrid lens is limited by the glass coating film. Therefore, the hybrid lens does not easily deform.

Other objects, advantages and novel features of the invention will become more apparent from the following detailed description when taken in conjunction with the accompanying drawings, in which:

DETAILED DESCRIPTION OF THE INVENTION

Figure 1:
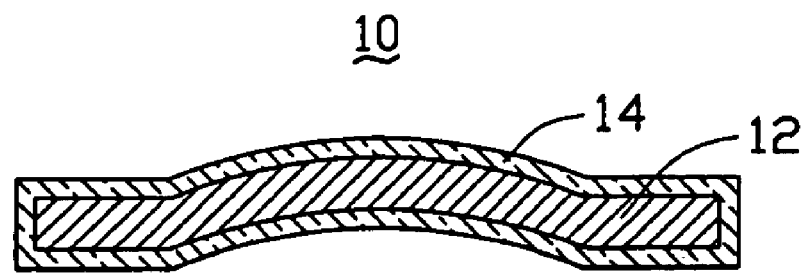
FIG. 1 is a side cross-sectional view of a hybrid lens according to an embodiment of the present invention.
Figure 2:
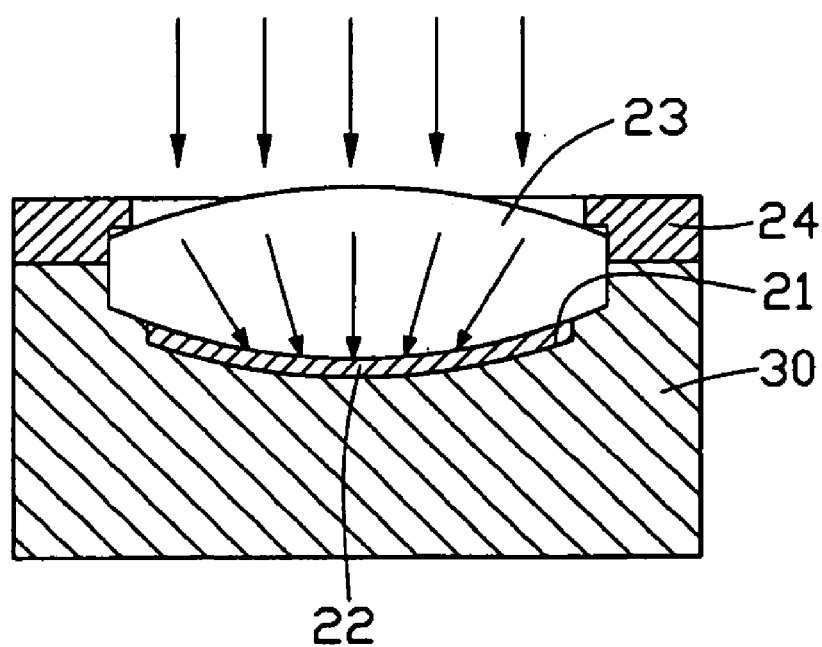
FIG. 2 is a schematic, cross-sectional view showing a conventional hybrid lens forming means and method.

FIG. 1 shows a hybrid lens according to an embodiment of the present invention. The hybrid lens 10 comprises a part of a plastic lens 12 and a coating film 14 made of optical glass material. The coating film 14 is formed on an outer surface of the plastic lens 12 and encloses the plastic lens 12.

The plastic lens 12 can be a spherical lens or an aspherical lens. The coating film 14 comprises a single layer of optical glass material or a plurality of layers of optical glass material, according to individual requirements.

A method for forming the hybrid lens 10 comprises the steps of:

(1) preparing a plastic substrate;
(2) forming a plastic lens 12 through a gate by injection molding the plastic substrate; and
(3) depositing the coating film 14 on an outer surface of the plastic lens 12.

In the first step, a suitable optical plastic substrate known in the art is provided. For example, the substrate may be made of one or more cycloolefin polymers.

In the second step, the optical plastic substrate is softened by heating, and then shaped in an aspherical mold made of heat-resistant material. The plastic lens 12 is formed in a mold using a conventional process such as injection molding, extruding, or drawing.

In the third step, optical glass material is vacuum deposited onto the outer surface of the plastic lens 12. This is accomplished by evaporating an optical glass material under high vacuum, and condensing the vaporized optical glass material on the outer surface of the plastic lens 12 to form the coating film 14. Initially, the optical glass material is placed inside a crucible and heated up. Typical heating means include, but are not limited to, electromagnetic waves, heated air, heated water, heated oil, and far-infrared waves.

The coating film 14 can alternatively be deposited on the plastic lens 12 in any other conventional known manner, such as by way of (but not limited to) magnetron sputter vapor deposition (MSVD), chemical vapor deposition (CVD), spray pyrolysis (i.e., pyrolytic deposition), atmospheric pressure CVD (APCVD), low-pressure CVD (LPCVD), plasma-enhanced CVD (PLC VD), plasma assisted CVD (PACVD), thermal or electron-beam evaporation, cathodic arc deposition, plasma spray deposition, and wet chemical deposition (e.g., sol-gel, mirror silvering, etc.). It is noted that sputter deposited coatings are perceived by some to be less mechanically durable than coatings deposited by spray pyrolysis or CVD-type coating methods. Examples of suitable CVD coating apparatuses and methods are found, for example, in (but not limiting the present invention to) U.S. Pat. Nos. 3,652,246, 4,351,861, 4,719,126, 4,853,257, 5,356,718, and 5,776,236.

In alternative embodiments, the coating film 14 can be formed on an outer surface of the plastic lens 12 whereby the coating film 14 only covers the upper surface and the bottom surface of the plastic lens 12. In addition, an edge portion of the plastic lens 12 can be reserved for clamping by a tool, such that the hybrid lens 10 can be secured in an imaging system. In such case, the edge portion cannot be used to focus light, and need not be covered by the coating film 14.

Since the plastic lens 12 is covered by the coating film 14 made of optical glass material, any deformation of the plastic lens 12 is physically limited by the coating film 14. A deformation coefficient of optical glass material is less than that of plastic material. Thus it is possible to reduce the aberrations of the hybrid lens 10, and to improve the aberration correction ability when the hybrid lens 10 is assembled into an optical unit.

In addition, the process of injection molding is suitable for a wide variety of plastic materials. The scope of application of the in method is broad, with a wide variety of commercially available plastic materials able to be used.

Furthermore, since deposition of the coating film 14 is simple, any one of numerous methods of deposition can be chosen. This makes it possible to produce the hybrid lens 10 at low cost.

It is believed that the present invention and its advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

We claim:

1. A hybrid lens comprising:
   a transparent lens; and
   a transparent coating formed on an outer surface of the transparent lens;
   wherein the transparent coating is made of a single layer of an optical material or a plurality of layers of an optical material, and the optical material has a deformation coefficient less than that of the transparent lens.

2. The hybrid lens as claimed in claim 1, wherein the optical material is glass material.

3. The hybrid lens as claimed in claim 1, wherein the transparent lens is made of plastic.

4. The hybrid lens as claimed in claim 3, wherein the plastic includes one or more cycloolefin polymers.

5. The hybrid lens as claimed in claim 3, wherein the transparent lens is manufactured by injection molding.

6. The hybrid lens as claimed in claim 1, wherein the transparent lens is spherical or aspherical.

7. The hybrid lens as claimed in claim 1, wherein the transparent coating encloses the transparent lens.

8. The hybrid lens as claimed in claim 1, wherein the transparent coating is deposited on the outer surface of the transparent lens by vacuum deposition.

9. A hybrid lens comprising:
   a non-glass transparent lens; and
   at least a glass coating formed on an outer surface of the non-glass transparent lens;
   wherein the glass coating has a deformation coefficient less than that of the non-glass transparent lens.

10. The hybrid lens as claimed in claim 9, wherein the glass coating encloses the non-glass transparent lens.

11. The hybrid lens as claimed in claim 9, wherein the non-glass transparent lens is spherical or aspherical.

12. The hybrid lens as claimed in claim 9, wherein the non-glass transparent lens is made of material selected from all kinds of cycloolefin polymers.

13. The hybrid lens as claimed in claim 9, wherein the glass coating is formed on the non-glass transparent lens by means of a way selected from the group consisting of vacuum deposition, magnetron sputter vapor deposition (MSVD), chemical vapor deposition (CVD), spray pyrolysis deposition, atmospheric pressure CVD (APCVD), low-pressure CVD (LPCVD), plasma-enhanced CVD (PLC VD), plasma assisted CVD (PACVD), thermal and electron-beam evaporation, cathodic arc deposition, plasma spray deposition, and wet chemical deposition.

* * * * *